United States Patent
Tremblay et al.

[11] Patent Number: 6,149,218
[45] Date of Patent: Nov. 21, 2000

[54] RAISED ROOF FOR VEHICLES

[75] Inventors: Jules Tremblay, Sunland; Dale Wayne Carpenter, Simi Valley; William J. Dingman, Canyon Country, all of Calif.

[73] Assignee: Ricon Corporation, Panorama City, Calif.

[21] Appl. No.: 09/173,200

[22] Filed: Oct. 15, 1998

[51] Int. Cl.[7] .................................................. B62D 25/06
[52] U.S. Cl. ...................... 296/26.04; 296/210; 296/213
[58] Field of Search ..................... 296/210, 156, 296/164, 213, 26.04; D12/401; 29/401.1; 414/921

[56] References Cited

U.S. PATENT DOCUMENTS

| | | | |
|---|---|---|---|
| D. 191,511 | 10/1961 | Weed | D12/401 |
| 4,575,148 | 3/1986 | Bieber | 296/210 |
| 4,837,914 | 6/1989 | Borum et al. | 29/401.1 |
| 4,987,522 | 1/1991 | Miyano et al. | 296/213 X |
| 5,029,936 | 7/1991 | Gonzalez | 296/210 |

FOREIGN PATENT DOCUMENTS

| | | | |
|---|---|---|---|
| 1566998 | 1/1967 | France | 296/210 |
| 3826662 | 2/1990 | Germany | 296/210 |

OTHER PUBLICATIONS

Speedy Wagon Brochure.

*Primary Examiner*—Dennis H. Pedder
*Attorney, Agent, or Firm*—Thomas I. Rozsa; Tony D. Chen; Jerry Fong

[57] ABSTRACT

An improved, raised roof for mounting to a vehicle and includes two integrated rain gutters for diverting water away from the sides of the vehicle. The improved, raised roof further includes an integrated door frame with a side recess for receiving extended upper door portions of the vehicle.

17 Claims, 3 Drawing Sheets

6,149,218

RAISED ROOF FOR VEHICLES

BACKGROUND OF THE INVENTION

1. Field of the Invention

The present invention generally relates to the field of vehicles. More particularly, the present invention relates to the field of improved custom raised roofs for vehicles.

2. Description of the Prior Art

Generally, custom raised roofs for vehicles such as a van or minivan are well known in the art. Referring to FIG. 6, there is shown a prior art raised roof 1 attached to the upper body portion 4 of the vehicle body 5. One of the disadvantages with the prior art raised roof 1 is that they do not provide integrated rain gutters for diverting water away from the sides of the vehicle, and thereby the water impairs the vision of a driver. The prior art raised roof 1 utilizes the existing rain gutters which are separated pieces mounted around the vehicle body. However, utilizing the existing rain gutters will not work with extended upper door portions of the vehicle doors because they are cut off. Another disadvantage with these prior art raised roofs is that they do not provide an integrated door frame recess for receiving extended upper door portions of the vehicle doors.

It is highly desirable to have a very efficient and also very effective design and construction of an improved, raised roof with integrated rain gutters for diverting water away from the sides of the vehicle. It is also desirable to provide an improved, raised roof with an integrated door frame opening for receiving extended door portions of the vehicle.

SUMMARY OF THE INVENTION

The present invention is an improved, raised roof for mounting to a vehicle. The improved, raised roof includes two integrated rain gutters for diverting water away from the sides of the vehicle. The improved, raised roof further includes an integrated door frame opening for receiving extended door portions of the vehicle.

It is an object of the present invention to provide an improved, raised roof for mounting to a vehicle, where the raised roof has two opposite integrated rain gutters for diverting water away from the sides of the vehicle.

It is a further object of the present invention to provide an improved, raised roof for mounting to a vehicle, where the raised roof has an integrated door frame opening for receiving extended door portions of doors of the vehicle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
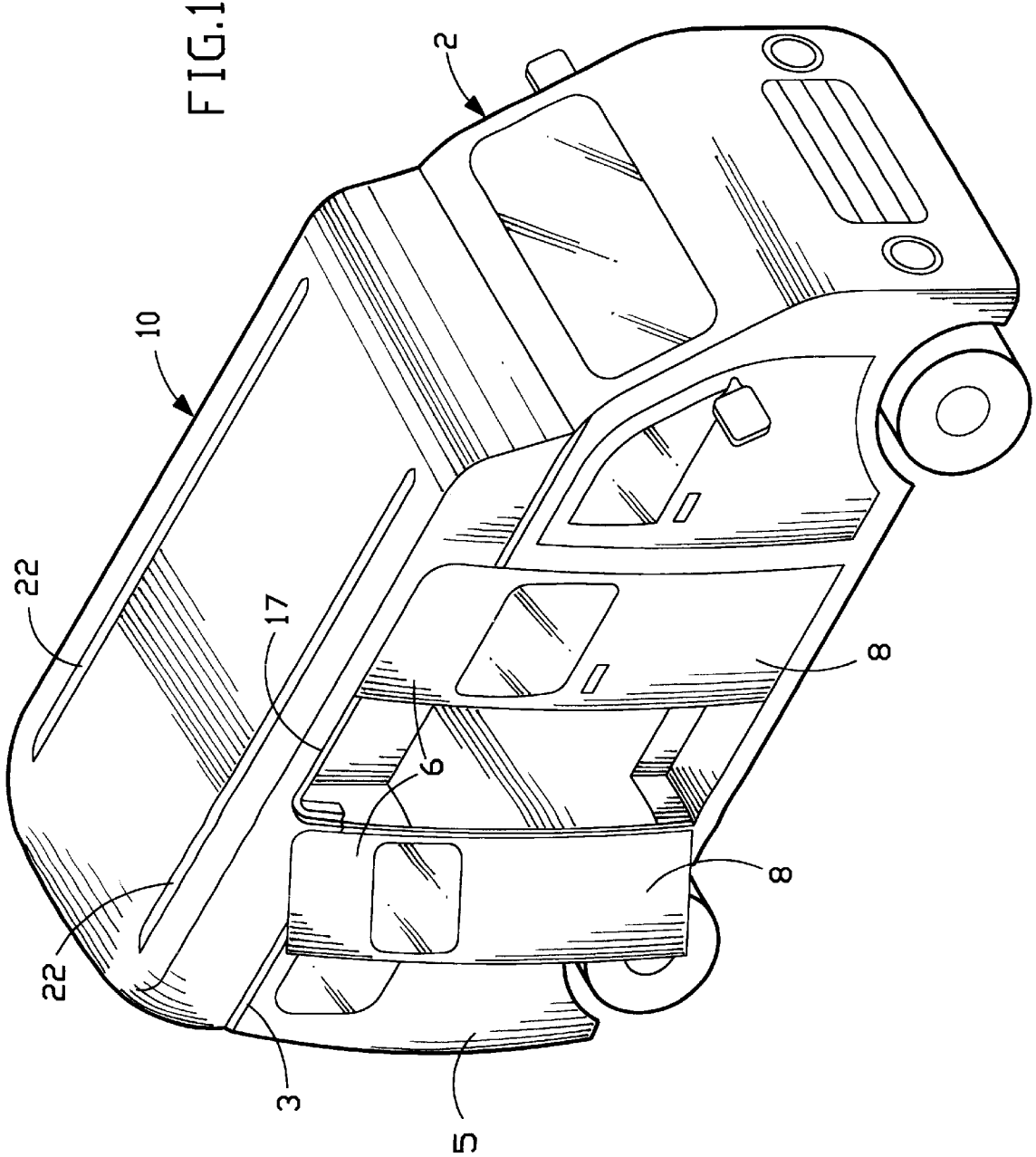
FIG. 1 is an isometric view of a vehicle with the present invention improved, raised roof mounted to the vehicle, and showing one of the doors open and the other door closed.
Figure 5:
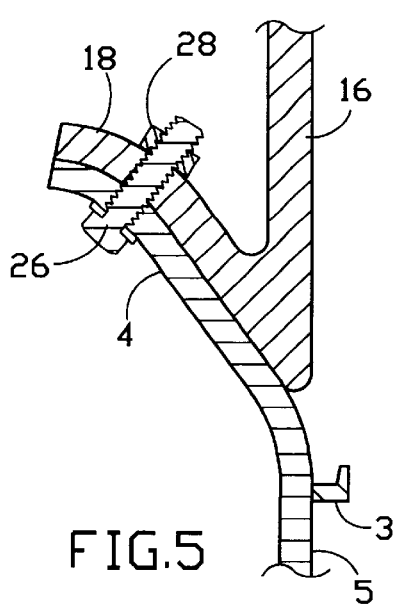
FIG. 5 is an enlarged partial cross-sectional view showing the present invention improved, raised roof mounted to the upper body portion of a vehicle.
Figure 6:
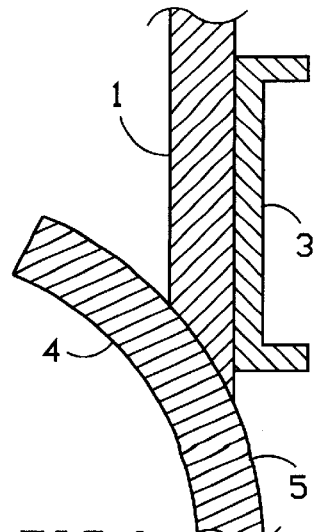
FIG. 6 is an enlarged partial cross-sectional view of a prior art raised roof mounted to the upper body portion of a vehicle.

Referring to FIGS. 1 and 5, there is shown at 10 the present invention improved custom raised roof mounted to an upper body portion 4 of a vehicle 2 such as a van or minivan and an existing rain gutter 3 around the vehicle body 5 and attached above the vehicle windows.

Referring to FIGS. 1, 2, 3, and 4, the raised roof 10 is a generally rectangular shaped unitary rigid structure 12 sized to cover a roof opening of the vehicle. The rigid structure 12 includes a generally horizontal top panel 14 with an arc contour on the top, a generally vertical periphery wall 16 integrally molded with and extending downwardly from the top panel 14, and an inwardly curved periphery mounting flange 18 integrally molded to a bottom of the periphery wall 16.

Referring again to FIG. 5, the periphery mounting flange 18 is conformed with the upper body portion 4 of the vehicle 2 such that the periphery mounting flange 18 is mounted thereto by conventional means such as bolts 26 and nuts 28 (only one is shown for clarity purposes). The bolt 26 is inserted from the interior of the vehicle through the upper vehicle body portion and the mounting flange and secured thereto by the mounting nut 28. The uniqueness of the mounting flange 18 is that it is integrated to the entire raised roof and configured to face against the contour of the upper body portion 4 of the vehicle 2 and it provides a watertight seal between the raised roof 10 and the vehicle body 5. Furthermore, the mounting nut 28 and bolt 26 are mounted inside of the vehicle body so that it creates better protection and appearance of the jointing structure between the raised roof 10 and the vehicle body 4.

Figure 2:
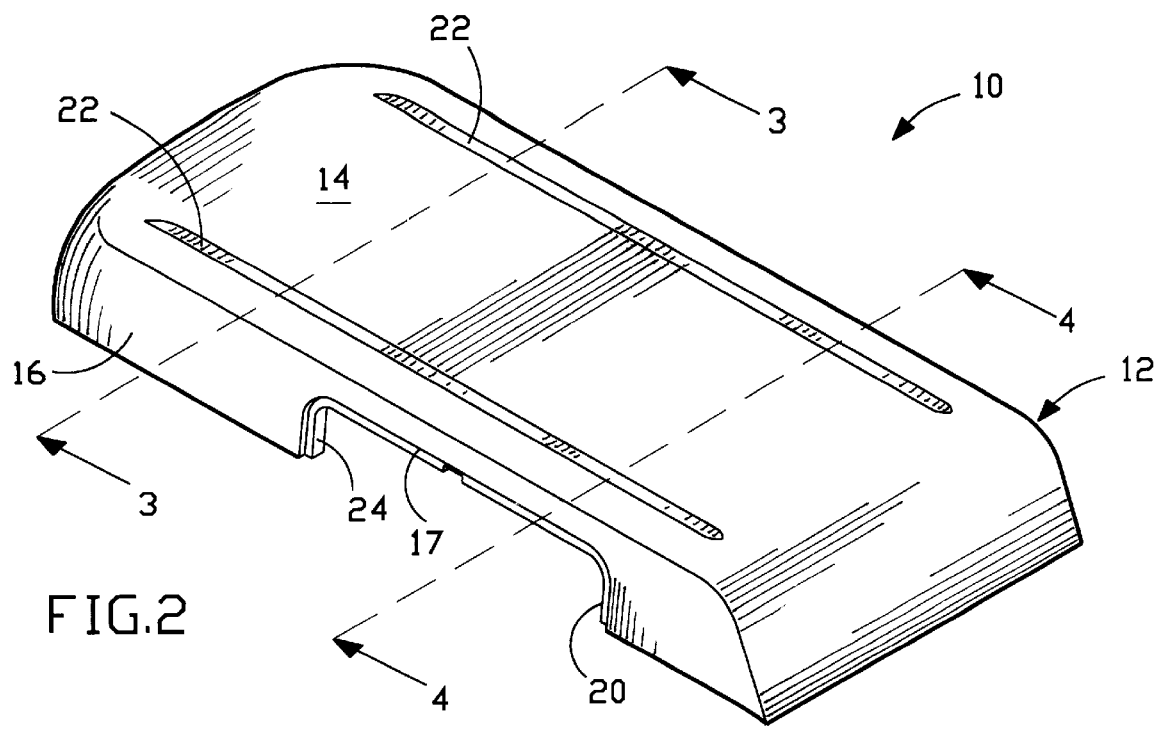
FIG. 2 is an isometric view of the present invention improved, raised roof.
Figure 3:
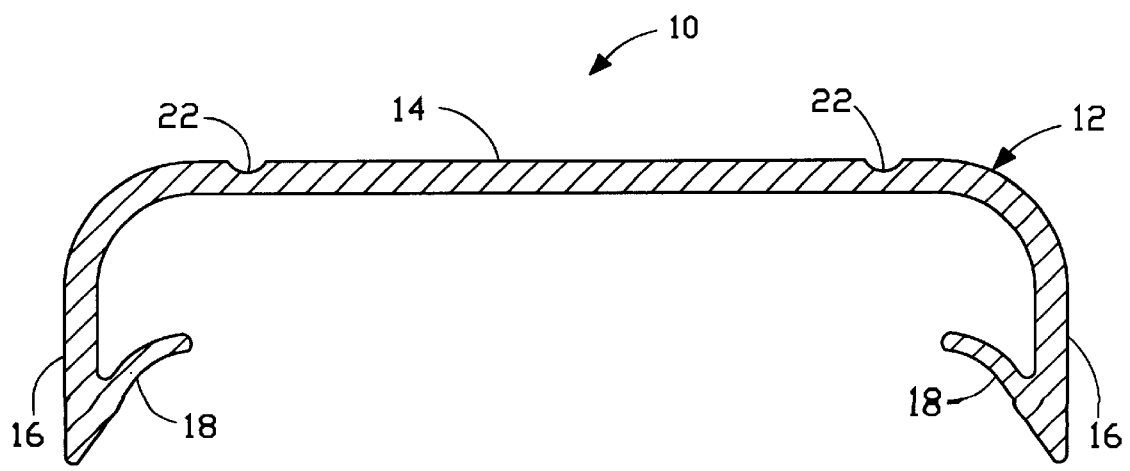
FIG. 3 is an enlarged cross-sectional view taken along line 3—3 of FIG. 2.
Figure 4:
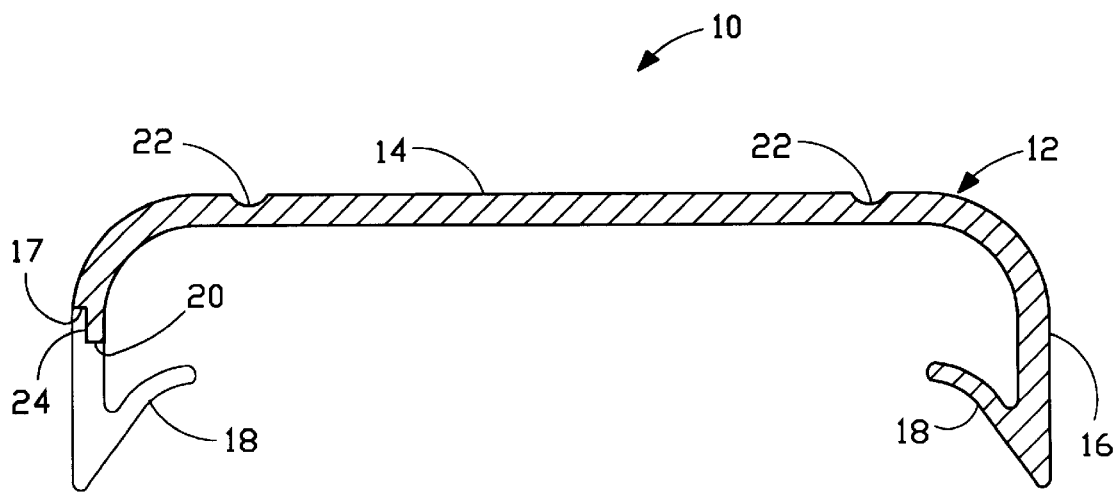
FIG. 4 is an enlarged cross-sectional view taken along line 4—4 of FIG. 2.

Referring to FIGS. 1, 2, and 4, the periphery wall 16 has a generally rectangular shaped side door frame 17 with a recess 20. The side door frame 17 has a step-down section 24 which receives extended upper door portions 6 of the vehicle doors 8 such that the extended upper door portions 6 are flush with the vertical periphery wall 16 (see FIG. 1). The side door frame 17 and the door recess 20 are all integrated to the raised roof structure 12.

The present invention raised roof 10 further includes a pair of opposite longitudinal rain gutters 22 which are integrally molded on the top surface of the top panel 14 of the unitary structure 12 for diverting water away from the sides of the vehicle 2 and especially around the area of the side door frame 17. These rain gutters 22 are generally concave shaped grooves as shown.

The present invention conforms to conventional forms of manufacture or any other conventional way known to one skilled in the art. The manufacturing process which could accommodate the construction of the raised roof may be fiberglass molding, injection, thermoform, etc. or other molding process. By way of example, the raised roof can be made of composite materials, fiber glass materials, synthetic materials or any other suitable materials known to one skilled in the art. The molding and mass production process would enable to produce the raised roof under cost efficient manners.

Defined in detail, the present invention is a raised roof for a vehicle having a roof opening and an upper body portion surrounding the roof opening, the raised roof comprising: (a) a generally rectangular shaped rigid structure being sized to cover the roof opening of the vehicle and having a generally horizontal top panel, a generally vertical periphery wall integrally molded to the top panel and extending downwardly therefrom, and a periphery flange integrally molded to a bottom of the periphery wall and extending inwardly curved therefrom and being conformed with the upper body portion of the vehicle such that the periphery flange is mountable thereto; and (b) a pair of opposite longitudinal rain gutters integrally molded to the top panel of the structure for diverting water away from the sides of the vehicle; (c) whereby the raised roof is mounted to the vehicle such that the two opposite rain gutters divert water away from the sides of the vehicle.

Defined broadly, the present invention is a raised roof for a vehicle having a roof opening and an upper body portion surrounding the roof opening, the raised roof comprising: (a) a rigid structure being sized to cover the roof opening of the vehicle and having a top panel, a periphery wall integrally molded to the top panel and extending downwardly therefrom, and a periphery flange integrally molded to the periphery wall and extending inwardly therefrom and being conformed with the upper body portion and mountable thereto; and (b) at least one rain gutter integrally molded to the top panel of the structure for diverting water away from a side of the vehicle; (c) whereby the raised roof is mounted to the vehicle such that the at least one rain gutter diverts water away from the side of the vehicle.

Defined more broadly, the present invention is a raised roof for a vehicle having a roof opening and an upper body portion surrounding the roof opening, the raised roof comprising a structure being sized to cover the roof opening of the vehicle and mountable to the upper body portion and having means for diverting water away from the sides of the vehicle.

Defined alternatively in detail, the present invention is a raised roof for a vehicle having a roof opening, an upper body portion surrounding the roof opening, and extended upper door portions, the raised roof comprising: (a) a generally rectangular shaped rigid structure being sized to cover the roof opening of the vehicle and having a horizontal top panel, a vertical periphery wall integrally molded to the top panel and extending downwardly therefrom, and a periphery flange integrally molded to a bottom of the periphery wall and extending inwardly curved therefrom and being conformed with the upper body portion of the vehicle such that the periphery flange is mountable thereto; and (b) the vertical periphery wall having an integrated door frame with a side recess for receiving the extended upper door portions of the vehicle such that the extended upper door portions are flush with the vertical periphery wall.

Defined alternatively broadly, the present invention is a raised roof for a vehicle having a roof opening, an upper body portion surrounding the roof opening, and extended door portions, the raised roof comprising: (a) a rigid structure being sized to cover the roof opening of the vehicle and having a top panel, a periphery wall integrally molded to the top panel and extending downwardly therefrom, and a periphery flange integrally molded to the periphery wall and extending inwardly curved therefrom and being conformed with the upper body portion of the vehicle and mountable thereto; and (b) the periphery wall having an integrated door frame with a recess for receiving the extended door portions of the vehicle such that the extended door portions are flush with the periphery wall.

Defined alternatively more broadly, the present invention is a raised roof for a vehicle having a roof opening and extended door portions, the raised roof comprising a structure being sized to cover the roof opening of the vehicle and having an integrated door frame with a recess for receiving the extended door portions of the vehicle such that the extended door portions are flush with the integrated door frame.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A raised roof for use in conjunction with a vehicle having a body, the body having a side door frame, an upper periphery body portion extending inwardly and partially surrounding a roof opening, and at least one existing door positioned at the side door frame, the at least one existing door having an upper door extension protruding from a top end and extending above the upper periphery body portion, the raised roof comprising:

a. a unity rigid structure being sized to expand over said roof opening of said vehicle and having a top panel, a periphery sidewall integrally formed to the top panel and extending downwardly therefrom, and a periphery mounting flange integrally formed to the periphery sidewall and extending upwardly and inwardly therefrom and being conformed with the exterior surface of said upper body portion;

b. said periphery sidewall having a door extension recess with a shoulder portion formed in one piece with the rigid structure an integrated door extension recess for accommodating said upper door extension of said at least one existing door such that said upper door extension is flush with said periphery sidewall when said at least one existing door is closed;

c. at least one rain gutter integrally formed to said top panel of said unity rigid structure for diverting water away from a side of said vehicle; and d. means for securing said periphery mounting flange to said upper body portion of said vehicle and thereby providing a watertight seal therebetween said periphery mounting flange and said upper body portion for preventing water leaks to the interior of said vehicle;

e. whereby said raised roof is mounted to said vehicle to provide a watertight seal therebetween and said at least one rain gutter diverts water away from the side of said vehicle.

2. The raised roof in accordance with claim 1 wherein said unity rigid structure is made of composite materials.

3. The raised roof in accordance with claim 2 wherein said composite materials include synthetic materials.

4. The raised roof in accordance with claim 1 wherein said unity rigid structure is made of fiber glass materials.

5. A raised roof for use in conjunction with a vehicle having body, the body having a side door frame, an upper periphery body portion extending inwardly and partially surrounding a roof opening, and at least two existing doors positioned at the side door frame, each existing door having an upper door extension protruding from a top end and extending above the upper periphery body portion, the raised roof comprising:
   a. a generally rectangular shaped unity rigid structure being sized to expand over said roof opening of said vehicle, the unity rigid structure having a generally horizontal top panel, a periphery sidewall integrally molded to a periphery edge of the top panel and extending downwardly therefrom, and a periphery mounting flange integrally molded to a bottom edge of the periphery sidewall and extending upwardly and inwardly curved therefrom and being conformed with the exterior surface of said upper body portion of said vehicle;
   b. said periphery sidewall having a door extension recess with a shoulder portion formed in one piece with the rigid structure an integrated upper door recess for accommodating said upper door extension of said each existing door such that said upper door extension of said each existing door is flush with said periphery sidewall when said each existing door is closed;
   c. a pair of longitudinal rain gutters integrally molded to said top panel of said unity structure at opposite sides for diverting water away from sides of said vehicle; and
   d. means for securing said periphery mounting flange to said upper body portion of said vehicle and thereby providing a watertight seal therebetween said periphery mounting flange and said upper body portion for preventing water leaks to the interior of said vehicle;
   e. whereby said raised roof is mounted to said vehicle to provide a watertight seal therebetween and said two rain gutters divert water away from the sides of said vehicle.

6. The raised roof in accordance with claim 5 wherein said unity rigid structure is made of composite materials.

7. The raised roof in accordance with claim 6 wherein said composite materials include synthetic materials.

8. The raised roof in accordance with claim 5 wherein said unity rigid structure is made of fiber glass materials.

9. A raised roof for use in conjunction with a vehicle having a body, the body having a side door frame, an upper periphery body portion extending inwardly and partially surrounding a roof opening, and at least one existing door positioned at the side door frame, the at least one existing door having an upper door extension protruding from a top end and extending above the upper periphery body portion, the raised roof comprising:
   a. a unity rigid structure being sized to expand over said roof opening of said vehicle, the unity rigid structure having a top panel, a periphery sidewall integrally formed with the top panel and extending downwardly therefrom, and a periphery mounting flange integrally formed with the periphery sidewall and extending upwardly and inwardly therefrom and being conformed with the exterior surface of said upper body portion of said vehicle;
   b. said periphery sidewall having a door extension recess with a shoulder portion formed in one piece with the rigid structure an integrated door extension recess for accommodating said upper door extension of said at least one existing door such that said upper door extension is flush with said periphery sidewall when said at least one existing door is closed; and
   c. means for securing said periphery mounting flange to said upper body portion of said vehicle and thereby providing a watertight seal therebetween said periphery mounting flange and said upper body portion for preventing water leaks to the interior of said vehicle.

10. The raised roof in accordance with claim 9 wherein said unity rigid structure is made of composite materials.

11. The raised roof in accordance with claim 10 wherein said composite materials include synthetic materials.

12. The raised roof in accordance with claim 9 wherein said unity rigid structure is made of fiber glass materials.

13. The raised roof in accordance with claim 9 further comprising at least one rain gutter integrally molded to said top panel of said unity rigid structure for diverting water away from a side of said vehicle.

14. A raised roof for use in conjunction with a vehicle having body, the body having a side door frame, an upper periphery body portion extending inwardly and partially surrounding a roof opening, and at least two existing doors positioned at the side door frame, each existing door having an upper door extension protruding from a top end and extending above the upper periphery body portion, the raised roof comprising:
   a. a generally rectangular shaped unity rigid structure being sized to expand over said roof opening of said vehicle, the unity rigid structure having a horizontal top panel, a periphery sidewall integrally molded to a periphery edge of the top panel and extending downwardly therefrom, and a periphery mounting flange integrally molded to a bottom edge of the periphery sidewall and extending upwardly and inwardly curved therefrom and being conformed with the exterior surface of said upper body portion of said vehicle;
   b. said periphery sidewall having a door extension recess with a shoulder portion formed in one piece with the rigid structure an integrated upper door recess for accommodating said upper door extension of said each existing door such that said upper door extension of said each existing door is flush with said periphery sidewall when said each existing door is closed; and
   c. means for securing said periphery mounting flange to said upper body portion of said vehicle and thereby providing a watertight seal therebetween said periphery mounting flange and said upper body portion for preventing water leaks to the interior of said vehicle;
   d. at least two longitudinal rain gutters integrally molded to said top panel of said unity rigid structure and located on opposite sides for diverting water away from sides of said vehicle.

15. The raised roof in accordance with claim 14 wherein said unity rigid structure is made of composite materials.

16. The raised roof in accordance with claim 15 wherein said composite materials include synthetic materials.

17. The raised roof in accordance with claim 14 wherein said unity rigid structure is made of fiber glass materials.

* * * * *